US006330530B1

United States Patent
Horiguchi et al.

(10) Patent No.: US 6,330,530 B1
(45) Date of Patent: Dec. 11, 2001

(54) METHOD AND SYSTEM FOR TRANSFORMING A SOURCE LANGUAGE LINGUISTIC STRUCTURE INTO A TARGET LANGUAGE LINGUISTIC STRUCTURE BASED ON EXAMPLE LINGUISTIC FEATURE STRUCTURES

(75) Inventors: Keiko Horiguchi; Alexander Franz, both of Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/420,510

(22) Filed: Oct. 18, 1999

(51) Int. Cl.[7] .............................. G06F 17/28; G06F 17/27; G10L 21/00
(52) U.S. Cl. ..................... 704/4; 704/7; 704/9; 704/277
(58) Field of Search .................................. 704/2, 3, 4, 5, 704/6, 7, 8, 9, 10, 1, 277; 707/530, 531, 532, 536

(56) References Cited

U.S. PATENT DOCUMENTS

| | | | |
|---|---|---|---|
| 5,088,038 | 2/1992 | Tanaka et al. | 704/2 |
| 5,101,349 * | 3/1992 | Tokuume et al. | 704/9 |
| 5,426,583 | 6/1995 | Uribe-Echebarria Diaz De Mendiil | 704/2 |
| 5,510,981 * | 4/1996 | Berger et al. | 704/2 |
| 5,528,491 | 6/1996 | Kuno et al. | 704/9 |
| 5,535,120 | 7/1996 | Chong et al. | |
| 5,659,765 * | 8/1997 | Nii | 704/4 |
| 5,727,222 * | 3/1998 | Maxwell, III | 704/9 |
| 5,768,603 * | 6/1998 | Brown et al. | 704/9 |
| 5,819,210 * | 10/1998 | Maxwell, III et al. | 704/9 |
| 5,864,788 | 1/1999 | Kutsumi. | |
| 5,903,860 * | 5/1999 | Maxwell, III et al. | 704/9 |
| 5,907,821 * | 5/1999 | Kaji et al. | 704/4 |
| 5,963,894 | 10/1999 | Richardson et al. | 704/9 |
| 5,983,169 | 11/1999 | Kozma | 704/2 |
| 6,064,953 * | 5/2000 | Maxwell, III et al. | 704/9 |
| 6,161,083 * | 12/2000 | Franz et al. | 704/4 |
| 6,223,150 * | 4/2001 | Duan et al. | 704/9 |

FOREIGN PATENT DOCUMENTS

0805403 A * 11/1997 (EP) .

OTHER PUBLICATIONS

S. Kurohashi, T. Nakamura, Y. Matsumoto, M. Nagao. Improvements of Japanese Morphological Analyzer JUMAN. In: "Proceedings of the International Workshop on Sharable Natural Language Resources", p. 22–28, Nara, Japan,1994.

Kenneth W. Church, "A Stochastic Parts Program and Noun Phrase Parser for Unrestricted Text", in Proceedings of the Second Applied Natural Language Processing Conference, Austin, TX, 1988.

Edited by Karen Jensen, George E. Heidorn, Stephen D. Richardson, "Natural Language Processing: The PLNLP Approach", Kluwer Academic Publishers, 1993, 22 pages.

Stuart M. Shieber, An Introduction to Unification–based Approaches to Grammar, CSLI, 1986, 23 pages.

(List continued on next page.)

Primary Examiner—Joseph Thomas
(74) Attorney, Agent, or Firm—Blakely, Sokoloff, Taylor & Zafman

(57) ABSTRACT

A system and method for transforming input source language linguistic structures (SLS) to target linguistic language linguistic structures (TLS) are described. In one embodiment, the SLS is matched to at least one existing source language example linguistic structure (SEF). The SLS is aligned with the at least one SEF, and the TLS is generated using at least one target language example linguistic structure (TEF) corresponding to the at least one SEF.

42 Claims, 14 Drawing Sheets

OTHER PUBLICATIONS

M. Tomita, T. Mitamura, H. Musha, M. Kee, "The Generalized LR Parser/Compiler Version 8.1: User's Guide", CMU–CMT–88–MEMO, Apr. 20, 1988, 44 pages.

M. Tomita, K. Knight, "Pseudo–Unification and Full–Unification", CMU, 1987, 10 pages.

M. Ishii, K. Ohta, H. Saito, "An Efficient Parser Generator for Natural Language", COLING 1994, 3 pages.

O. Furuse, H. Iida, "An Example–Based Method for Transfer–Driven Machine Translation", Proceedings of the Conference on Theoretical and Methodological Issues on Machine Translation (TMI–92), 1992, p. 139–150.

P. Resnik, "Using Information Content to Evaluate Semantic Similarity in a Taxonomy", Proceedings of the International Joint Conference on Artificial Intelligence (IJCAI–95), 1995.

T.C. Bell, J. G. Cleary, I. H. Witten, "Text Compression", Prentice Hall, 1990, 19 pages.

H. Maruyama, H. Watanabe, "Three Cover Search Algorithm for Example–Based Translation", in Proceedings of the Fourth International Conference on Theoretical and Methodological Issues in Machine Translation (TMI–92), 1991, p. 173–184.

* cited by examiner

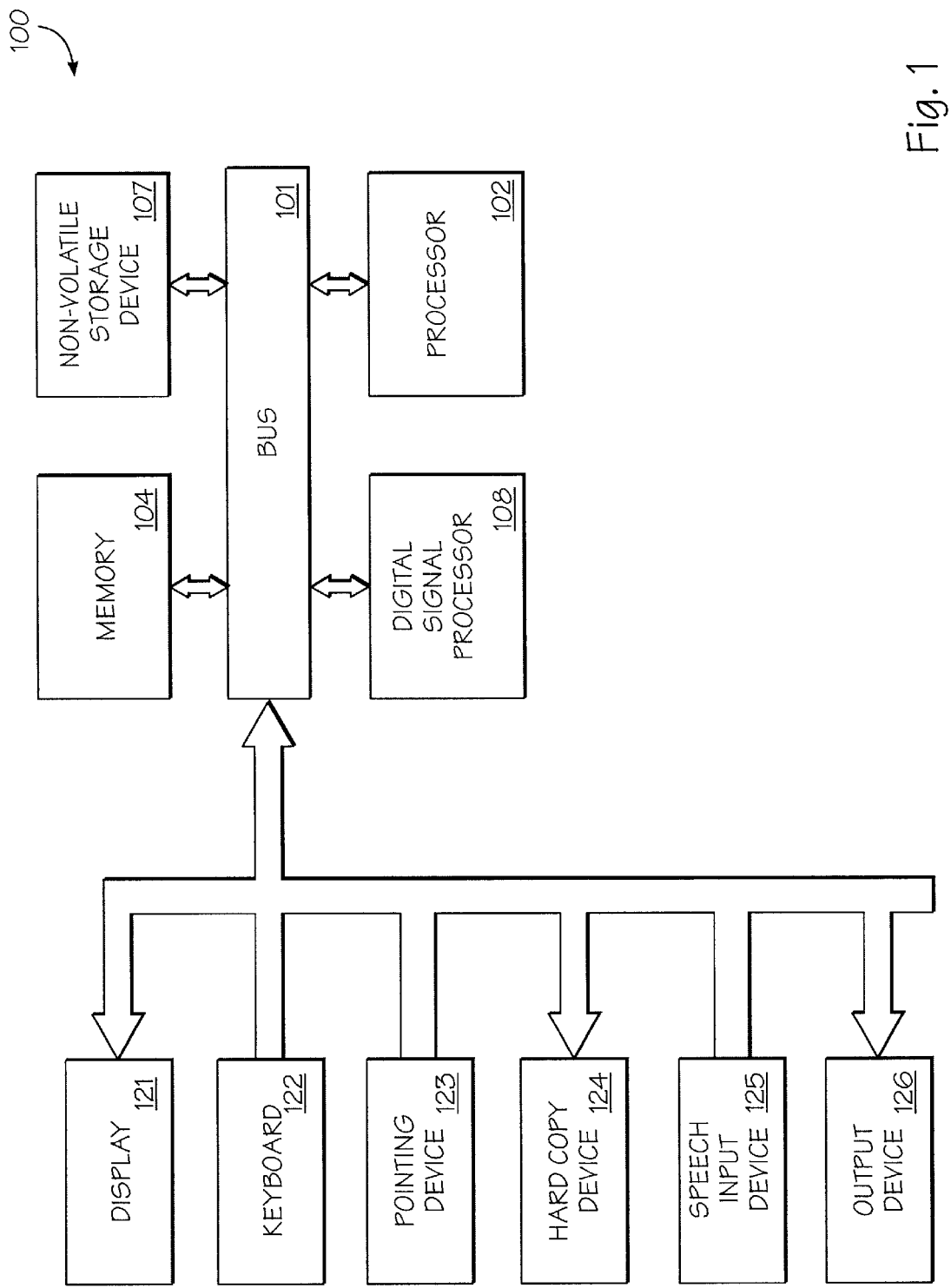

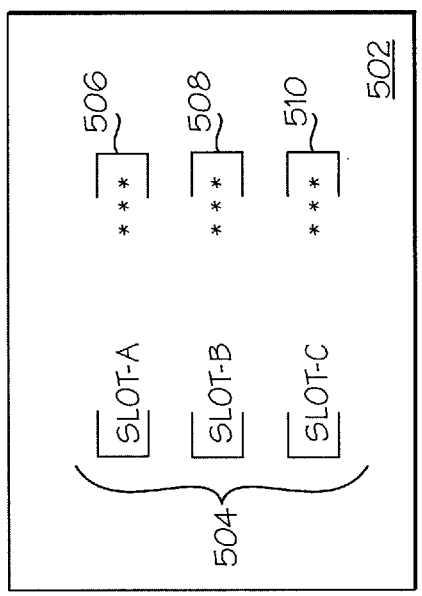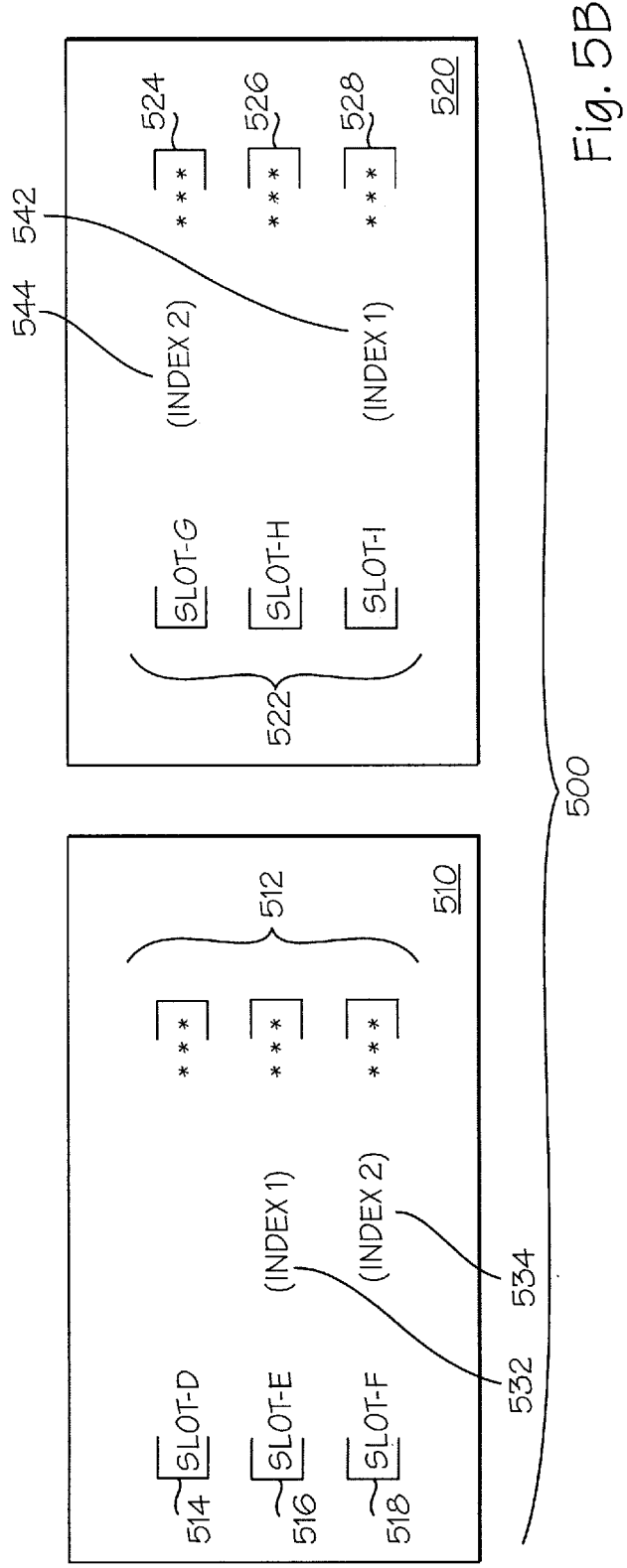

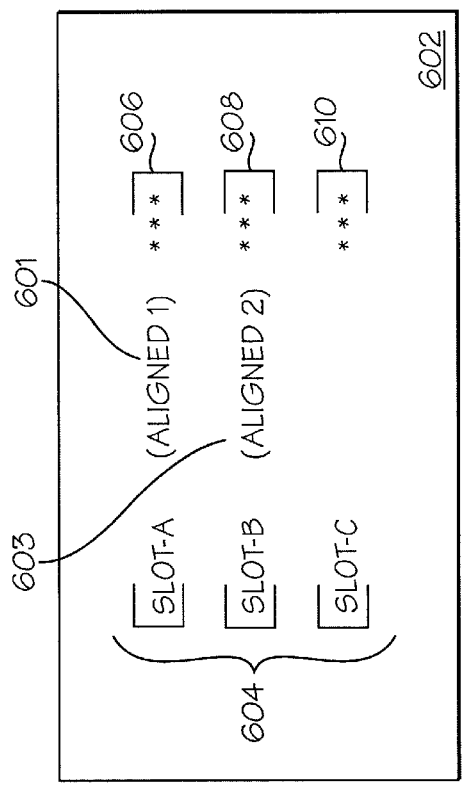
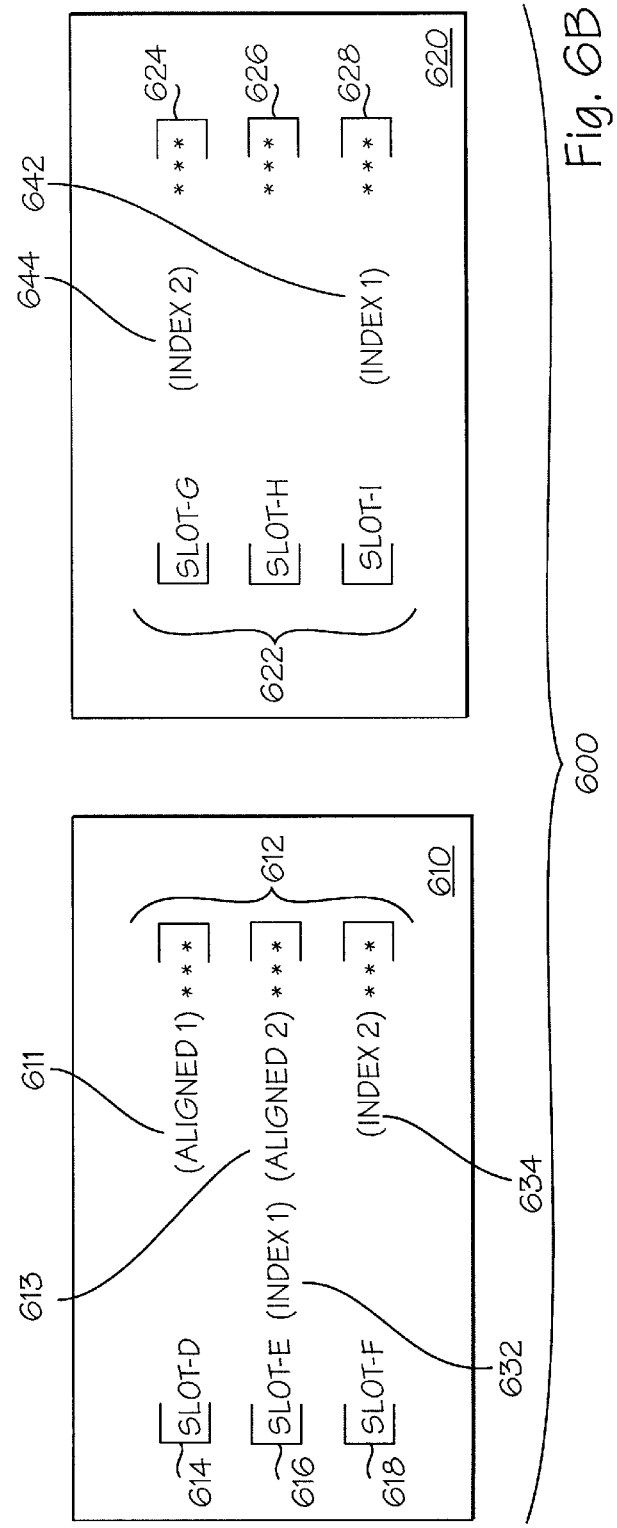
Fig. 6A
Fig. 6B

METHOD AND SYSTEM FOR TRANSFORMING A SOURCE LANGUAGE LINGUISTIC STRUCTURE INTO A TARGET LANGUAGE LINGUISTIC STRUCTURE BASED ON EXAMPLE LINGUISTIC FEATURE STRUCTURES

FIELD OF THE INVENTION

The present invention relates to language translation systems. More specifically, the present invention relates to the transformation of a source language linguistic structure into a target language linguistic structure.

BACKGROUND

To With the continuing growth of multinational business dealings where the global economy brings together business people of all nationalities and with the ease and frequency of today's travel between countries, the demand for a machine-aided interpersonal communication system that provides accurate near real-time language translation is a compelling need. This system would relieve users of the need to possess specialized linguistic or translation knowledge.

A typical language translation system functions by using natural language processing. Natural language processing is generally concerned with the attempt to recognize a large pattern or sentence by decomposing it into small sub-patterns according to linguistic rules. A natural language processing system uses considerable knowledge about the structure of the language, including what the words are, how words combine to form sentences, what the words mean, and how word meanings contribute to sentence meanings.

Morphological knowledge concerns how words are constructed from more basic units called morphemes. Syntactic knowledge concerns how words can be put together to form correct sentences and determines what structural role each word plays in the sentence and what phrases are sub-parts of what other phrases. Typical syntactic representations of language are based on the notion of context-free grammars, which represent sentence structure in terms of what phrases are sub-parts of other phrases. This syntactic information is often presented in a tree form. Typically, semantic knowledge concerns what words mean and how these meanings combine in sentences to form sentence meanings. This is the study of context-independent meaning—the meaning a sentence has regardless of the context in which it is used. The representation of the context-independent meaning of a sentence is called its logical form. The logical form encodes possible word senses and identifies the semantic relationships between the words and phrases.

Natural language processing systems further include interpretation processes that map from one representation to the other. For instance, the process that maps a sentence to its syntactic structure and logical form is called parsing, and it is performed by a component called a parser. The parser uses knowledge about word and word meaning, the lexicon, and a set of rules defining the legal structures, the grammar, in order to assign a syntactic structure and a logical form to an input sentence.

Formally, a context-free grammar of a language is a four-tuple comprising nonterminal vocabularies, terminal vocabularies, a finite set of production rules, and a starting symbol for all productions. The nonterminal and terminal vocabularies are disjoint. The set of terminal symbols is called the vocabulary of the language.

A natural language processor receives an input sentence in a source language, lexically separates the words in the sentence, syntactically determines the types of words, semantically understands the words, and creates an output sentence in a target language that contains the content of the input sentence. The natural language processor employs many types of knowledge and stores different types of knowledge in different knowledge structures that separate the knowledge into organized types.

In transferring a linguistic representation of a source language (such as English) to the linguistic representation for a target language (such as Japanese), a significant amount of linguistic knowledge needs to be incorporated in order to achieve a high-quality translation. In a prior method for transferring, an transfer-driven method was developed. In this method, transfer rules that operated at a string, pattern, or semantic grammar rule level. The input sentence was analyzed using the transfer rules, and the rules that developed the best analyses were used to generate the target-language output. In addition, example expressions were used to annotate the transfer rules directly.

In another prior method, a dependency tree representation was used to store examples of the source linguistic structures. During transfer, this method selected a set of example fragments that completely coverts the input. The target-language expression was then constructed from the target-language portions of the selected fragments. The dependency trees created are not detailed enough to account for many natural language expressions. This method also requires exact matches between the input and examples. Because of the variability of natural languages, exact matches are hard to achieve or require extremely large databases of examples.

What is required is a method and system that incorporates the ease and accuracy of the example-based method with the ability to manipulate the transfer rules to allow for a variety of attempts at translation.

SUMMARY OF THE INVENTION

A system and method for transforming input source language linguistic structures (SLS) to target linguistic language linguistic structures (TLS) are described. In one embodiment, the SLS is matched to at least one existing source language example linguistic structure (SEF). The SLS is aligned with the at least one SEF, and the TLS is generated using at least one target language example linguistic structure (TEF) corresponding to the at least one SEF.

BRIEF DESCRIPTION OF THE DRAWINGS

The objects, features and advantages of the present invention will be apparent to one skilled in the art in light of the following detailed description in which:

FIG. 1 is a block diagram of one embodiment for an architecture of a computer system;

FIGS. 2b, 2c, and 2d are exemplary diagrams of structures used by the natural language translation system of FIG. 2a;

FIG. 5a is a block diagram illustrating an exemplary input feature structure;

FIG. 5b is a block diagram illustrating an exemplary bilingual example database pair;

FIG. 6a is a block diagram illustrating an exemplary aligned source language input feature structure;

FIG. 6b is a block diagram illustrating an exemplary aligned bilingual example database pair;

DETAILED DESCRIPTION

Figure 2A:
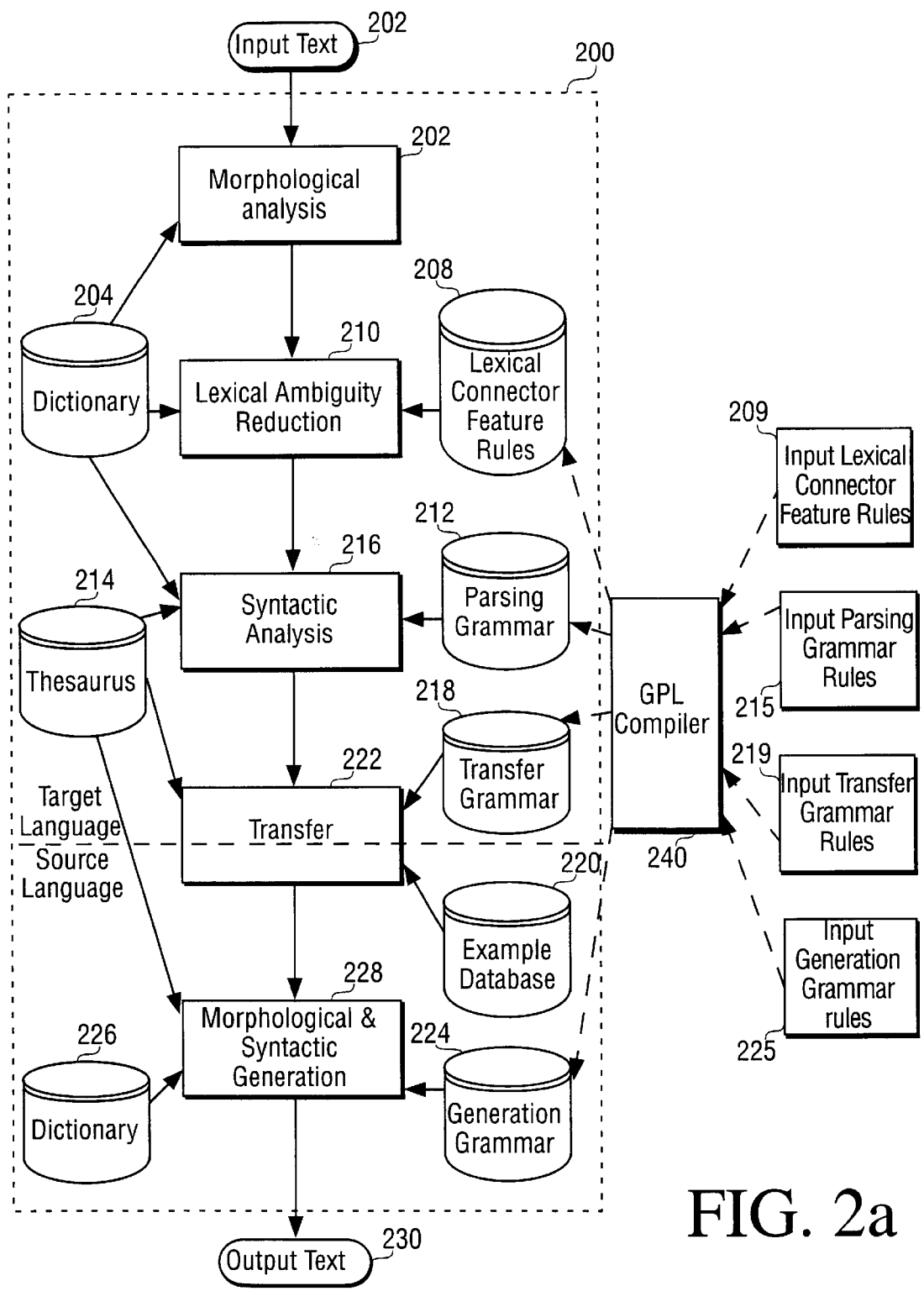
FIG. 2a is a block diagram of one embodiment for a natural language translation system.

A system and method for transforming input source language linguistic structures (SLS) to target linguistic language linguistic structures (TLS) are described. In one embodiment, the SLS is matched to at least one existing source language example linguistic structure (SEF). The SLS is aligned with the at least one SEF, and the TLS is generated using at least one target language example linguistic structure (TEF) corresponding to the at least one SEF. The at least one SEF and the at least one TEF are corresponding pairs of entries within an example database. In one embodiment, the matching and alignment are performed recursively.

In one embodiment, compiled transfer grammar rules are applied to the SLS to create a plurality of SLS sub-structures. The transfer rules are written in a GPL programming language that allows a large variety of manipulations of the SLS sub-structures that is required for high-quality translation. The grammar rules are recursively applied to the SLS sub-structures from a top-most transfer rule until all SLS sub-structures within the SLS are transferred to corresponding TEF sub-structures contained within the TEF. The TLS is generated from the entire set of TEF that result from the input of one SLS. In one embodiment, a separate example database of corresponding expressions in the source and target language is used.

In the following detailed description of embodiments of the invention, reference is made to the accompanying drawings in which like references indicate similar elements, and in which is shown by way of illustration specific embodiments in which the invention may be practiced. Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the sub-stance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 is a block diagram of one embodiment for an architecture of a computer system 100. Referring to FIG. 1, computer system 100 includes system bus 101 that allows for communication among processor 102, digital signal processor 108, memory 104, and non-volatile storage device 107. System bus 101 may also receive inputs from keyboard 122, pointing device 123, and speech signal input device 125. System bus 101 provides outputs to display device 121, hard copy device 124, and output device 126 (such as, for example, an audio speaker). Memory 104 may include, for example, read only memory (ROM), random access memory (RAM), flash memory, or any combination of the above.

It will be appreciated that computer system 100 may be controlled by operating system software which includes a file management system, such as, for example, a disk operating system, which is part of the operating system software. The file management system may be stored in non-volatile storage device 107 and may be configured to cause processor 102 to execute the various functions required by the operating system to input and output data and to store data in memory 104 and on non-volatile storage device 107.

FIG. 2a is a block diagram of one embodiment for a natural language translation system 200. Referring to FIG. 2a, natural language translation system 200 includes five modules, supporting databases, and associated grammars to quickly and accurately translate text between source and target languages. Input text may be directly input into natural language translation system 200 (for example, as with a person typing sentences into a computer using keyboard 122). Alternatively, input text to natural language translation system 200 may be the output of another system, such as, for example, output from a speech recognition system (for example, speech input device 125), or from an optical character recognition system (not shown).

An English sentence "He wants to go to the White House" is used throughout this section as example text input to describe the functioning of the system 200. The individual units in a sentence are referred to herein as "words" but the natural language translation system 200 is not limited to only word-based natural languages, having equal applicability to translation of character-based languages as well. Except where the differences in processing word-based and character-based languages are specified, the term "word" is intended to encompass both words and characters.

In the following description, a grammar is generally a set of context-free rules that define the valid phrase structures in the source or target language, with each context-free rule associated with one or more statements (the "rule body") that perform tests and manipulations on the linguistic representations (feature structures). Thus, an English sentence may be combined from a noun phase (NP) and a verb phrase (VP), but the subject and verb forms must agree, e.g., "He want to go to the White House" is a valid phrase structure but an improper English sentence. All rule bodies utilized by the grammars of language translation system 200 are in the form of computer-executable routines produced by defining the grammar in terms of a grammar programming language (GPL) and passing appropriate rule bodies (209, 215, 219, and 225) through a GPL compiler 240. The output of the GPL compiler 240 may be in the form of directly executable code, or may be in the form of standard computer programming language statements (such as, for example, C, C++, Pascal, or Lisp) which are then input into the corresponding programming language compiler to produce executable code. In either case, the compiled grammars include a specific function for each context-free rule. The specific function performs all the processing required by the rule and its associated rule body. Furthermore, the interfaces between the compiled grammars and the modules enable a single language translation system 200 to perform translation between multiple natural languages, and to perform more than one translation simultaneously.

A morphological analysis module 206 takes text input 202 and uses a source language dictionary 204 to decompose the words into morphemes by identifying root forms, grammatical categories, and other lexical features of the words. The morphological analysis module 206 builds a "feature structure" for each word. Feature structures are well known in the art as linguistic data structures that contain feature-value pairs for strings, symbols, and numbers that appear in a natural language sentence. Each feature of a word is mapped to the appropriate value through a function commonly designated as:

word↦[feature:value]

Thus, a simplified, exemplary representation of the feature structures for the words "he" and "wants" are as follows:

$$I \mapsto \begin{bmatrix} root: he \\ cat: pronoun \end{bmatrix} \quad \text{(Feature Structure 1)}$$

$$wants \mapsto \begin{bmatrix} \begin{bmatrix} root: want \\ cat: noun \end{bmatrix} \\ OR \\ \begin{bmatrix} root: want \\ cat: verb \end{bmatrix} \end{bmatrix} \quad \text{(Feature Structure 2)}$$

The Feature Structure 2 may be referred to as a "disjunctive" feature structure as it represents two mutually exclusive feature structures that are valid for the word. It will be appreciated that the grammatical category is not the only feature of these two words and that morphological analysis module 206 outputs full feature structures. The example feature structures are simplified for the sake of clarity in explanation and are also frequently represented by a shorthand notation, e.g., [want] or NP[ ].

The feature structures built by morphological analysis module 206 are input into lexical ambiguity reduction module 210. In one embodiment, lexical ambiguity reduction module 210 may segment the words in character-based languages that do not utilize spaces through a database of lexical connector feature rules 208. Lexical connector feature rules 208 are created from GPL grammar statements as described above. Each possible combination of adjacent segmented words are assigned a lexical cost. Dictionary 204 defines combinations of words ("multiwords"). Lexical ambiguity reduction module 210 evaluates each feature structures that contains a part-of-speech (POS) ambiguity, such as the feature structure for the word "wants" which is tagged as both a noun and a verb. The various possible POS tags are assigned a lexical cost. Lexical ambiguity reduction module 210 weighs the cost assigned to each word in the sentence and selects those feature structures that have the lowest cost.

Figure 2B:
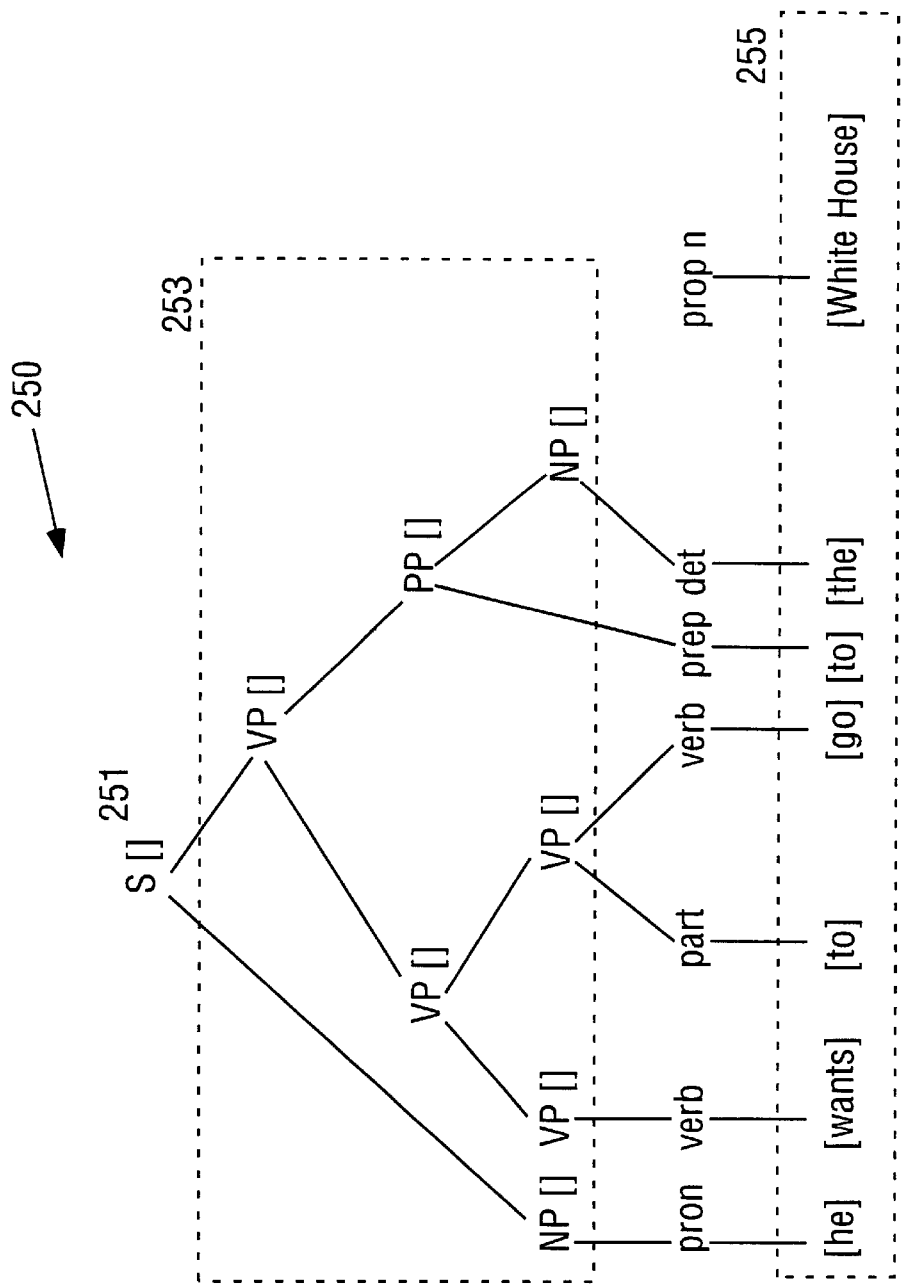

The feature structures chosen for the words by lexical ambiguity reduction module 210 are passed to syntactic analysis module 216. Syntactic analysis module 216 combines the chosen feature structures into a feature structure that represents the content of the input sentence. Syntactic analysis module 216 uses parsing grammar 212 to create a syntax parse tree for the sentence. Parsing grammar 212 contains the source language context-free grammar rules in the form of a parsing table and the associated rule bodies in executable code. Each leaf of the syntax parse tree is a feature structure for one of the words in the sentence. Once the leaves are created, an intermediate feature structure for each branch (parent) node in the syntax parse tree is built by combining its child nodes as specified in one or more of the context-free grammar rules. The rule body for each potentially applicable context-free grammar rule manipulates the various feature structures at the child nodes and determine whether the associated context-free rule could create a valid phrase from the possible combinations. It will be appreciated that the feature structure that results from applying the context-free grammar rules may be nested (i.e., contain multiple feature structures from each child node). Syntactic analysis module 216 may create the syntax parse tree shown in FIG. 2b for the example sentence from its constituent feature structures, with the following feature structure at the top (root) of the syntax parse tree to represent the full sentence:

$$S \rightarrow \begin{bmatrix} SUBJ & \text{``he''} \\ VERB & \text{``wants to go''} \\ OBJ & \text{``to the White House''} \end{bmatrix} \quad \text{(Feature Structure 3)}$$

It will be appreciated that both the syntax parse tree 250 and the Feature Structure 3 are not exact representations but are simplified for purposes of ease in explanation.

The feature structure for the sentence in the source language is passed to transfer module 222. The feature structure represents the analysis of the source input and may contain a number of nested linguistic representations (referred herein as sub-structures or slots). Transfer module 222 uses transfer grammar 218 to match source language slots of the input with source language slots in example database 220. Example database 220 contains feature structure pairs in the source language and a target language. For example, database 220 may contain matching feature structures in English and Japanese. Transfer grammar 218 consists of a set of rewrite rules with a context-free component and a GPL rule body. The context-free parts of the rules are used to create a transfer generation tree.

Figure 2C:
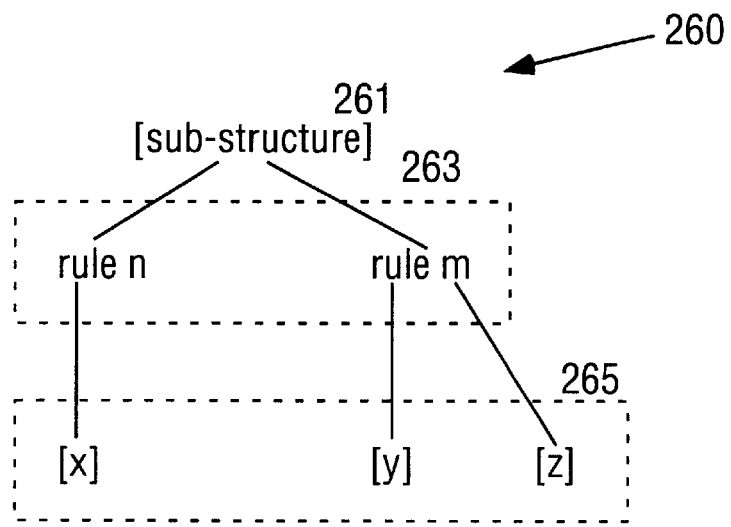

Transfer module 222 uses GPL rule bodies within transfer grammar 218 to match the input source sub-structures or slots to the source sub-structures or slots in example database 220. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2c is used to break the sub-structure into multiple sub-structures. The new input may be a part of the original, source feature structure or a new feature sub-structure that is constructed from sections of different slots.

Transfer module 222 uses the input feature structure (or sub-structure) in the source language as the starting symbol to build transfer generation tree 260. Root 261 is a symbol-node (s-node) and is labeled with the starting symbol of the feature structure. The transfer grammar determines which transfer grammar rules are applicable to the feature structure at the root 261, and creates child rule-node(s) (r-node) 263 depending from root 261. In one embodiment, r-nodes 263 are the rule numbers within transfer grammar 218 that may be validly applied to the input feature structure. Transfer grammar 218 rules added to tree 260 are applied to the s-nodes 265. If the application of each rule succeeds, a child rule-node (r-node) 265 is added to tree 260. If the application fails, the s-node 261 is tagged as "dead" for sub-sequent removal. Transfer grammar 218 then creates a new s-node 265 for each r-node 263. Again, the applicable rules are found for each s-node 265 and applied. The process is repeated until all sub-features within the feature structure have been expanded. Transfer generation tree 260 is then pruned to remove any "dead" nodes and corresponding sub-trees. If root 261 is tagged as "dead," the generation fails. Otherwise, the resulting transfer generation tree 260 is used by transfer module 222 to match the feature structure against the example database 220. The feature structures and sub-structures in the target language associated with a match are substituted for the corresponding feature structures and sub-structures matched in the source language. Transfer module 222 recursively applies the transfer rules contained within transfer grammar 218 from the top-most transfer rules until all meaningful sub-features or constituents within the input source feature structure are transferred to the target sub-structures. Transfer module 222 outputs a feature structure in the target language.

Figure 2D:
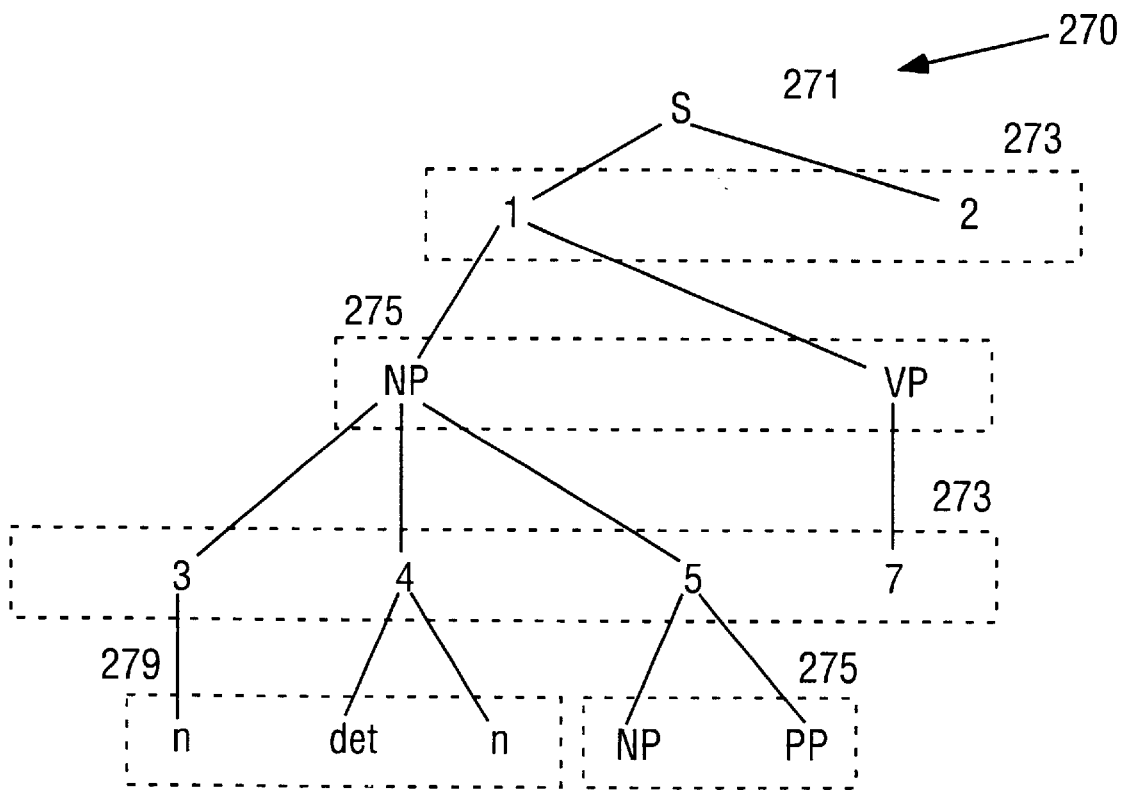

The feature structure for the sentence in the target language is passed to a morphological and syntactical generation module 228, where it is used as the root node for a syntactical generation tree, an example of which is shown in FIG. 2d. The syntactical generation tree is built in the same fashion as the transfer generation tree, with context-free rules in a generation grammar 224 as its r-nodes 273. The generation grammar 224 copies information to each s-node 275, 279. Unlike the transfer module 226, in which multiple sub-transfers created multiple transfer generation trees, only one syntactical generation tree is created by the morphological and syntactical generation module 228. Any s-node that is not a leaf node 279, i.e., associated with a feature structure for a word, is used to generate the next level of r-nodes. When all child s-nodes under an r-node are leaf nodes, the current branch of the tree is complete and the morphological and syntactical generation module 228 traverses back up the tree to find the next s-node that is not a leaf node. The transfer generation tree is complete when all the lowest level s-node are leaf nodes.

The leaf nodes contain output feature structures that represent valid sentences when the syntactical generation tree is complete. The sequence of output feature structures that represents the best sentence is converted into output text 230 by the morphological and syntactical generation module 228 using the dictionary 226, and the thesaurus 214 as necessary. Alternatively, all output feature structures for all sentences may be converted into the output text 230.

Figure 3:
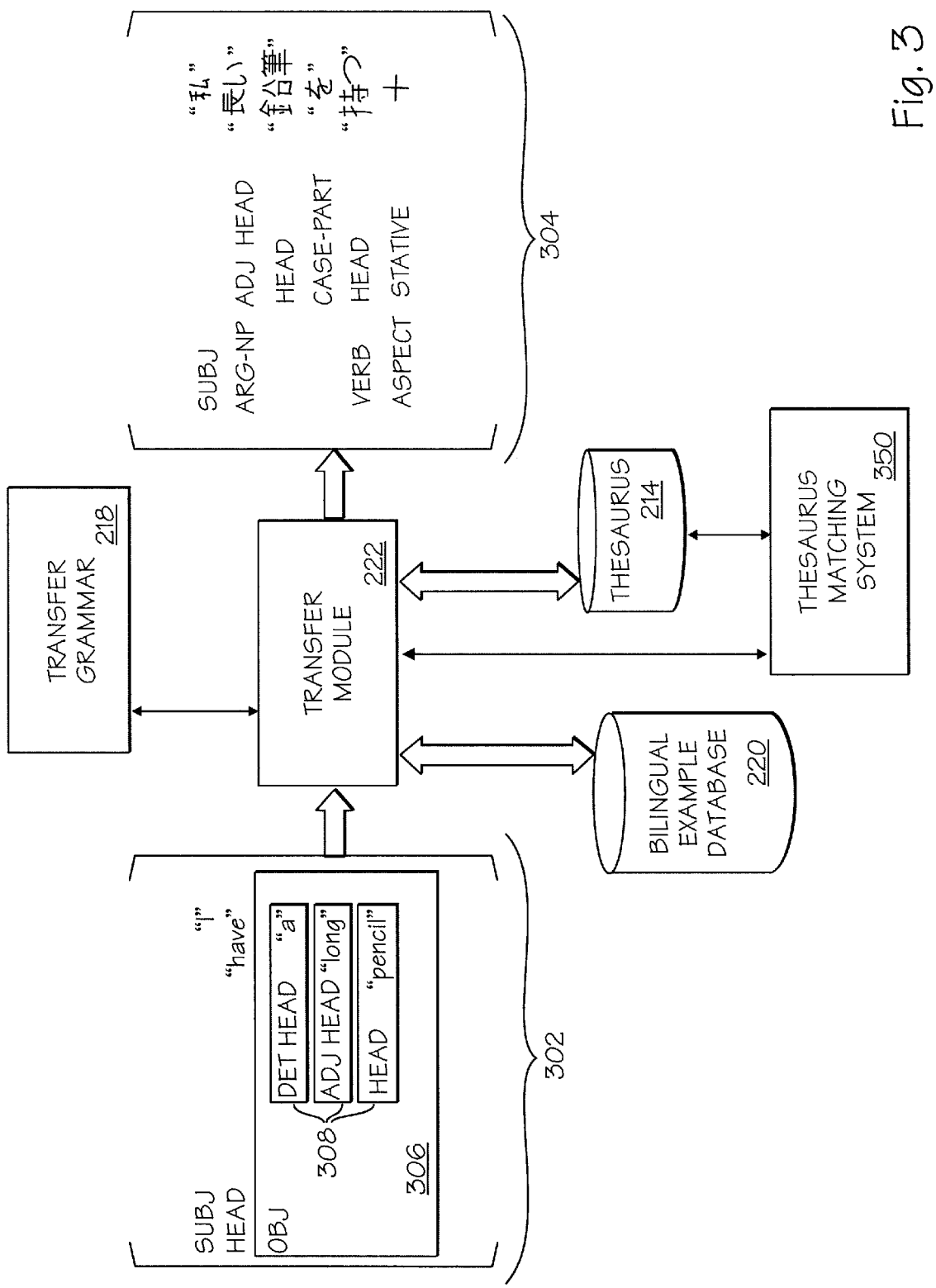
FIG. 3 is a block diagram of one embodiment for a language transfer system.

FIG. 3 is a block diagram of one embodiment for a language transfer system 300. Referring to FIG. 3, language transfer system 300 includes a transfer module 222 for transferring a source language feature structure (SLS) 302 to a target language feature structure (TLS) 304. During the transfer from SLS 302 to TLS 304, transfer module 222 uses transfer grammar 218 to create transfer generation trees. In addition, transfer module 222 searches bilingual example database 220 for matches between SLS 302 and source language example feature structures. In one embodiment, bilingual example database 220 may contain various linguistic constructs such as, for example, full sentences ("How do you do?", "May I help you?"), verb phrases ("I have an appointment.", "I have dinner"), multi-phrase fragments ("difficult to get to"), and noun phrases ("strong coffee", "tea"). In one embodiment, transfer module 222 uses thesaurus matching system 350 to determine a match cost between SLS 302 and the source language example feature structures determine if the match between two structures is close. If the match is good (in one embodiment, below a certain match cost), transfer module 222 accepts and uses the source language feature structure. Transfer module 222 then checks if all sub-structures of SLS 302 have been accounted for or aligned with corresponding sub-structures in the source language example feature structure. If sub-structures are not aligned, transfer module 222 uses the unaligned sub-structure as input and recursively executes itself. In addition, transfer module 222 replaces targeted indexed slots within target language feature structure. The indexing operating is described below. After the entire SLS 302 is matched and aligned with source example structure, the slots within a target language example feature structure corresponding to the slots within source language example feature structure are combined and passed to morphological and syntactical generation module 228.

Transfer module 222 uses extensions to the context-free rules within transfer grammar 218 to match SLS 302 to source language example feature structures in example database 220. Transfer grammar 218 executes thesaurus matching system 350 to determine corresponding thesaurus 214 codes for both slots. These codes serve as input to a matching module within thesaurus matching system 350. Matching module searches thesaurus 214 to find the most specific thesaurus 214 entry that dominates a thesaurus code from each representation. Matching module retrieves previously calculated relative entropy values from thesaurus 214 and calculates an overall match cost for the slots.

A transfer generation tree of the form shown in FIG. 2c is produced by applying the transfer rules which are used to define how to process the sub-structures. The GPL rule bodies in the transfer rules create a new structure for matching. The new input may be a part of the original input feature structure or a new sub-structure that is constructed from sections of different slots.

Referring to FIG. 3, calculating the match cost and alignment between SLS 302 and the source language example feature structures may require combining more than one example feature structure to create a complete translation. For example, the input sentence "I have a long pencil." may require combining two source example structures such as "I have a pencil." and "I had a long nap." Transfer module 222 may try inserting "long" into this first example, replacing "nap" with "pencil" and changing verb tense in the second example, or both.

In applying the grammar rules, transfer grammar 218 first applies matching more specific examples found then gradually applies more and more general matchings. In one embodiment, boolean test matching rules within grammar 218 are passed to thesaurus matching system 350 to allow specific examples (such as, for example, "verb phrases with negative", or "tenses other than present") to be used only when input slots 504 with these specific features are transferred. These rules are executed in a particular order. In addition, transfer grammar 218 transfers the largest slots it can find and then necessarily transfers smaller sub-slots if the larger transfer fails. In one embodiment, transfer grammar 218 is recursively called from the top-most transfer rules until all meaningful sub-structures are transferred. When no match is found, a number of back-up rules within grammar 218 are applied to allow a simple, rule-based treatment of the unmatched slot or syntactic structure. For example, to allow a direct transfer or to delete the structure.

Figure 4:
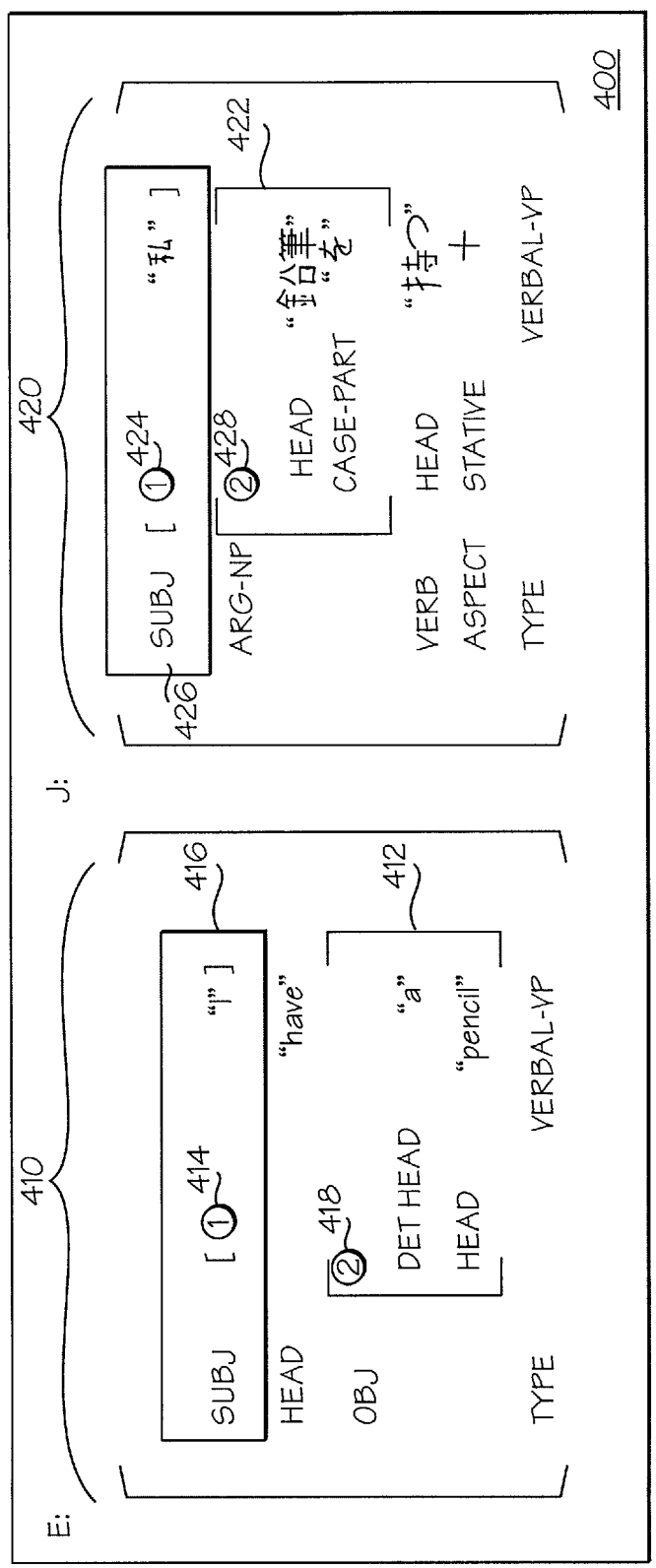
FIG. 4 is a block diagram illustrating an exemplary bilingual example database pair.

FIG. 4 is a block diagram illustrating an exemplary bilingual example database pair 400. Bilingual example database pair 400 consists of a source language example feature structure (SEF) 410 and a target language example feature structure (TEF) 420. Source language example feature structure 410 may include a number of source language example slots 412. Each slot 412 may in turn contain a number of nested slots. In FIG. 4, source language sub-structure 412 corresponds to target language sub-structure 422. In addition, during prior processing, bilingual example database 220 is cross indexed between source and target languages. Referring to FIG. 4, subject slot 416 is indexed as "1" 414. This corresponds to target slot 426 and is shown as "1" 424. FIG. 4 also includes an index 2 in source language example slot 412 at 418 corresponding to target language example slot 422 at 428. The indexing operation will be described in detail below.

FIG. 5a is a block diagram illustrating an exemplary source language input feature structure (SLS) 502. SLS 502 includes a series of input slots 504 (input slots 506–510). Input slots 504 are linguistic representations or feature structures and may contain a series of nested slots or sub-structures (not shown). Referring to FIG. 5a, input slot 506 is labeled with linguistic symbol "Slot A" and the contents of slot 506 is indicated by a series of three asterisks for display purposes only. As shown in FIG. 3, SLS 302 may contain a series of nested input slots 504 indicated by linguistic symbols such as, for example, "SUBJ", "HEAD", and "OBJ". A variety of lexical structures may be represented. Referring to FIG. 5a, slot 504 may contain a series of nested sub-slots. For example, referring to FIG. 3, "OBJ" slot 306 contains a series of sub-slots 308 labeled with the linguistic symbols "DET HEAD", "ADJ HEAD", and "HEAD".

FIG. 5b is a block diagram illustrating an exemplary bilingual example database pair 500. Referring to FIG. 5b, source language example feature structure (SEF) 510 includes a series of source slots 512 (source slots 514–516). In addition, SEF 510 contains indexes 532 and 534. Bilingual example database pair 500 also contains target language example feature structure (TEF) 520. TEF 520 contains a number of target slots 522 (target slots 524–528) and contains indexes 542 and 544. Index 1 (532) of SEF 510 corresponds to index 1 (542) of TEF 520 and index 2 (534) of SEF 510 corresponds to index 2 (544) of TEF 520. The indexing operation is described in detail below. Transfer module 222 uses SLS 502 as input and finds a best match within database 220. The best match for SLS 502 is represented by bilingual database pair 500.

FIGS. 6a and 6b are block diagrams illustrating an exemplary aligned source language input feature structure (SLS) 302, SEF 610, and TEF 620. Referring to FIG. 6a, SLS 602 is the result of applying the matching and aligning rules to the FIG. 5a SLS 502. Transfer module 222 matches and aligns slots between SLS 502 and SEF 510 as described above. Transfer module 222 attempts to apply the matching by first trying to match the most specific examples first and then to match more general examples. The result is SLS 602 and SEF 610 showing aligned slots. Transfer grammar 218 consists of a set of rewrite rules with a context free component and a GPL rule body. If a slot of SLS 502 is not aligned, transfer module 222 uses the unaligned slot as input and recursively calls itself. Transfer module 222 uses the unaligned slot of SLS 502 as a starting symbol to build a transfer generation tree 260. The generation of the tree is described above. In one embodiment, example database 220 may change as the context of the language changes. That is, example database 220 changes as the context changes between travel language, medical language, legal language, and as more complex context is required. As the complexity of the context increases, more complex entries are required to be included in example database 220. The grammar rules first try to transfer the largest structure first and then recursively attempt to transfer smaller units within the structures.

Transfer module 222 first attempts to match SLS 502 to the example database 220 and finds the best match that it can. The match returns the bilingual example pair 600 consisting of SEF 610 and TEF 620. Transfer grammar 218 executes thesaurus matching system 350 to determine corresponding thesaurus 214 codes for both structures. These codes serve as input to matching module within thesaurus matching system 350. Matching module searches thesaurus 214 to find the most specific thesaurus 214 entry that dominates a thesaurus code from each representation. Matching module retrieves previously calculated relative entropy values from thesaurus 214 and calculates an overall match cost for the slots.

In addition, SEF 610 and TEF 620 may contain indexes to indicate correspondences between sub-constituents or sub-slots within the structures. Transfer module 222 checks if all slots of SEF 610 have been aligned with corresponding slots in TEF 620. If a slot is not aligned, the transfer module 222 uses the unaligned slot as input into the transfer grammar 218. Thus, transfer module 222 recursively executes the transfer grammar in order to align slots between SLS 502 and SEF 510 to generate the aligned SLS 602 and SEF 610.

Figure 7A:
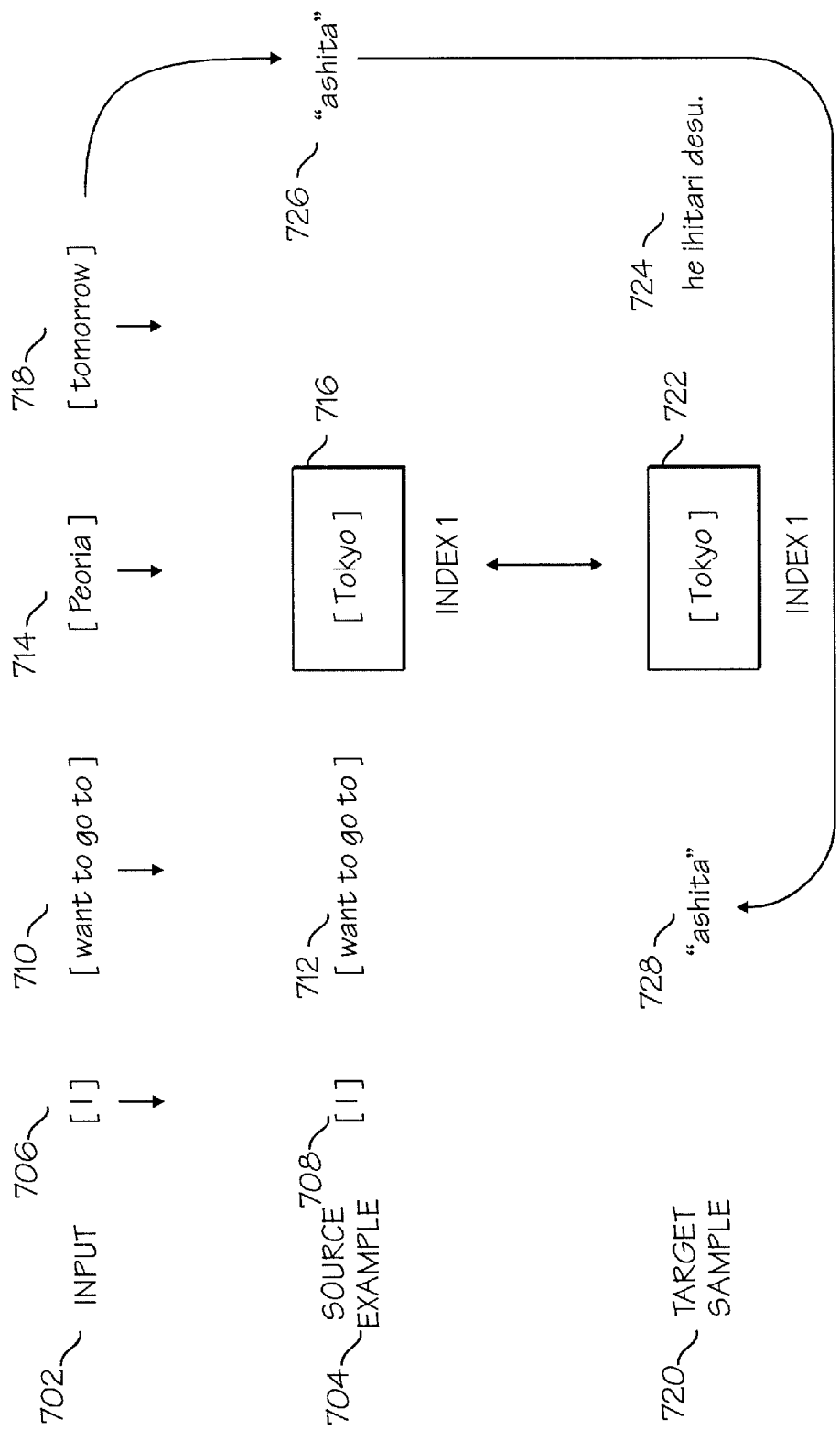
FIG. 7a is an exemplary aligned and indexed input sentence, source example sentence, and target example sentence.

FIG. 7a is an exemplary aligned and indexed input sentence, source example sentence, and target example sentence. Referring to FIG. 7a, input 702 is entered into the system and analyzed. For ease of explanation, the input sentence is shown in the form of a sentence rather than as a feature structure. However, the actual implementation of the matching and alignment processes are performed upon feature structures and not upon sentences. In the example, the input 702 consists of the sentence "I want to go to Peoria tomorrow." Transfer module 222 searches bilingual example database 220 and finds a nearest source example sentence 704. The source example sentence 704 found is "I want to go to Tokyo." Transfer module 222 then executes transfer grammar 218 to align input 702 to source example 704. In the FIG. 7a example, "I" 706 is aligned with "I" 708, "want to go" 710 is aligned with "want to go" 712, and "Peoria" 714 is aligned with "Tokyo" 716. "Tomorrow" 718 is unaligned. Corresponding to the source example 704 within example database 220 is a target example sentence 720. The target example sentence consists of the sentence (in Japanese for this example) "Tokyo-e Ikitai desu". Within example database 220, the word "Tokyo" 716 has been indexed. In one embodiment, an indexed item is a replaceable item as defined by thesaurus 214. For example, "Tokyo" 716 entry in thesaurus 214 may indicate that "Tokyo" may only be replaced by city names. Thus, in the example, if such a thesaurus 214 entry is present "Peoria" 714, a city name, may replace "Tokyo" in target example 720 at 722.

In the FIG. 7a example, input 702 contains the unaligned word "tomorrow" 718. In order to translate this slot, transfer module 222 calls transfer grammar 218 using "tomorrow" 718 as input. Transfer grammar 218 attempts to match "tomorrow" 718 to the example database 220. If "tomorrow" 718 is a sub-structure, the transfer grammar 218 creates a transfer generation tree 260 as described above and repeats the process of matching and alignment. In FIG. 7a, the replacement of "tomorrow" 718 is represented by "ashita" 726 which is the input to transfer module 222. The result of the application of the grammar rules to "YYY" 726 is placed in target example 722 at 728. Thus, for any nonaligned slot within input 702, transfer module 222 executes the matching module to match the sub-structure and the transfer grammar 218 to translate the unaligned sub-structures or slots.

Figure 7B:
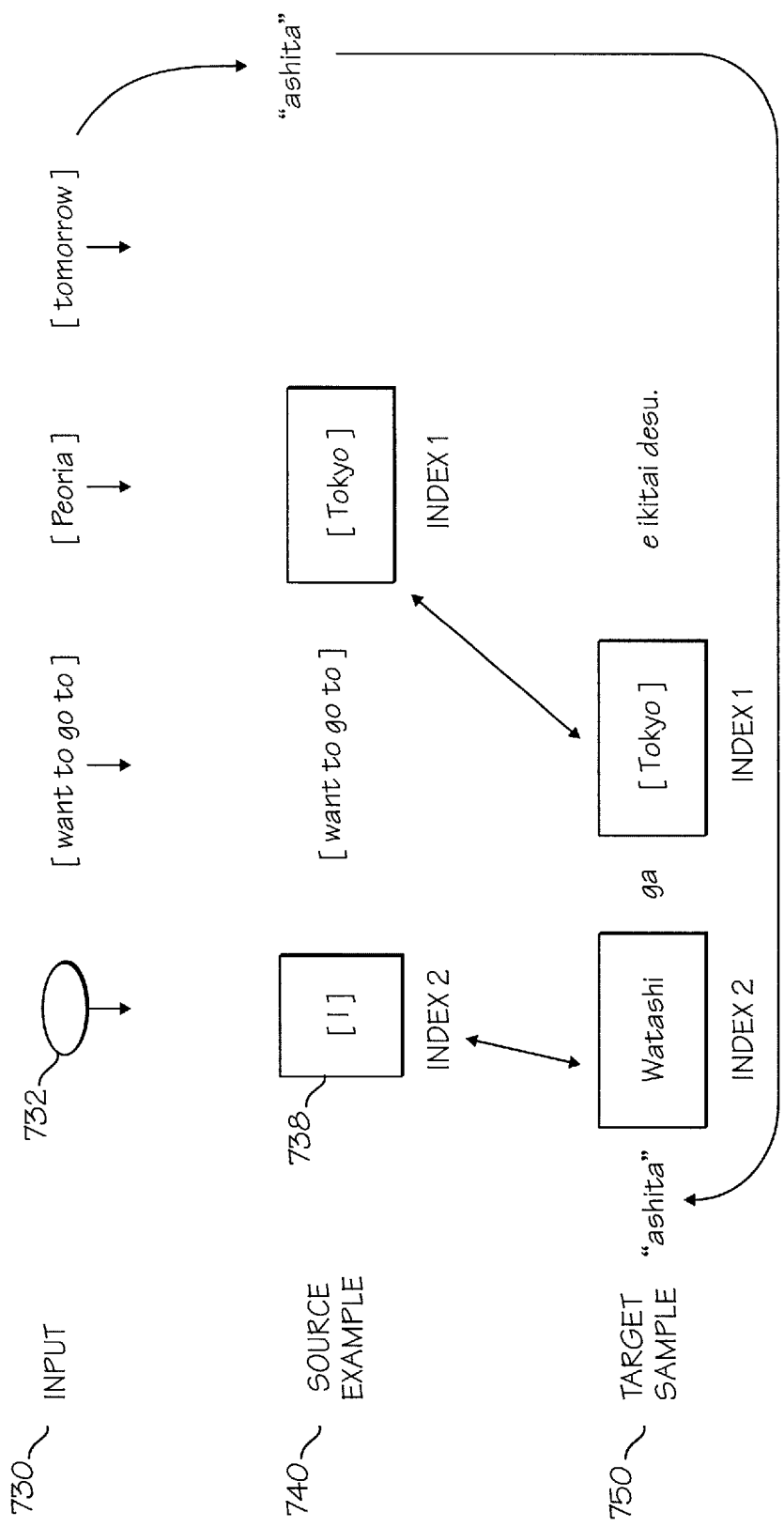
FIG. 7b is a second exemplary aligned and indexed input sentence, source example sentence, and target example sentence.

FIG. 7b is a second exemplary aligned and indexed input sentence, source example sentence, and target example sentence. Referring to FIG. 7b, input 730 does not contain the word "I" as shown in FIG. 7a. Thus, the best match found for input 732 in database 220 is source example 740, which is unaligned for the "I" position 738. If "I" 738 is an indexed item, transfer module 222 will execute transfer grammar 218 in order to replace or delete the indexed feature as described for FIG. 7a above. The operation of the indexing will be described in further detail below.

Figure 8:
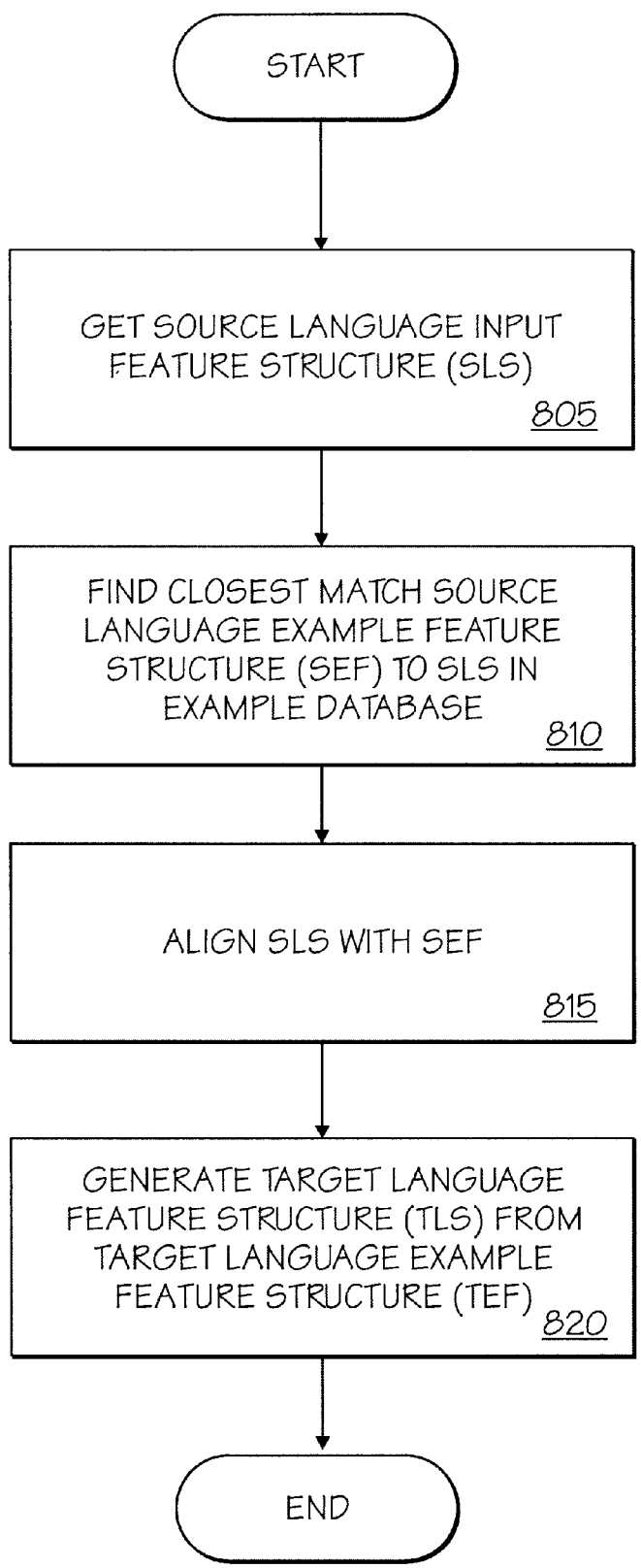
FIG. 8 is a flow diagram of one embodiment for transferring input feature structures to target feature structures.

FIG. 8 is a flow diagram of one embodiment for transferring source language input feature structures SLS 302 to target feature structures (TLS) 304. Initially, at processing block 805, SLS 302 is received. SLS 302 is used as the source to build a transfer generation tree 260 as described above to apply transfer grammar 218 rules to SLS 302. A feature structure is generated from the transfer generation tree 260 representing SLS 302.

At processing block 810, the returned feature structure is used to match against source language example feature structure (SEF) 410 entries in example database 220, processing from the top-most structure in SLS 302 through nested sub-structures within SLS 302. If an exact match is found, the matching SEF 410 is used for the transfer. Processing then continues at processing block 820. If an exact match is not found, thesaurus matching system 350 is used to define how good a match has been found. In one embodiment, if a match cost returned by matching system is below a certain level, matching SEF 410 will be used for transferring from source language to target language. If a match for the structure is not found, the structure is used as input to the transfer module and the process repeats at processing block 805 for the sub-structure.

At processing block 815, once a good match between SLS 302 and SEF 410 is found, it is determined if all slots within SLS 302 are aligned (or have been accounted for) with slots within SEF 410. If a slot within SLS 302 is not aligned, transfer module 222 is recursively called with the unaligned slot as input. The result of the recursive call is inserted into the appropriate slot in TEF 420. Transfer module 222 may make a number of recursive calls within the recursive call until a matching aligned slot is found.

At processing block 820, slots from TEF 410 are used to generate target language feature structure (TLS) 304.

Figure 9:
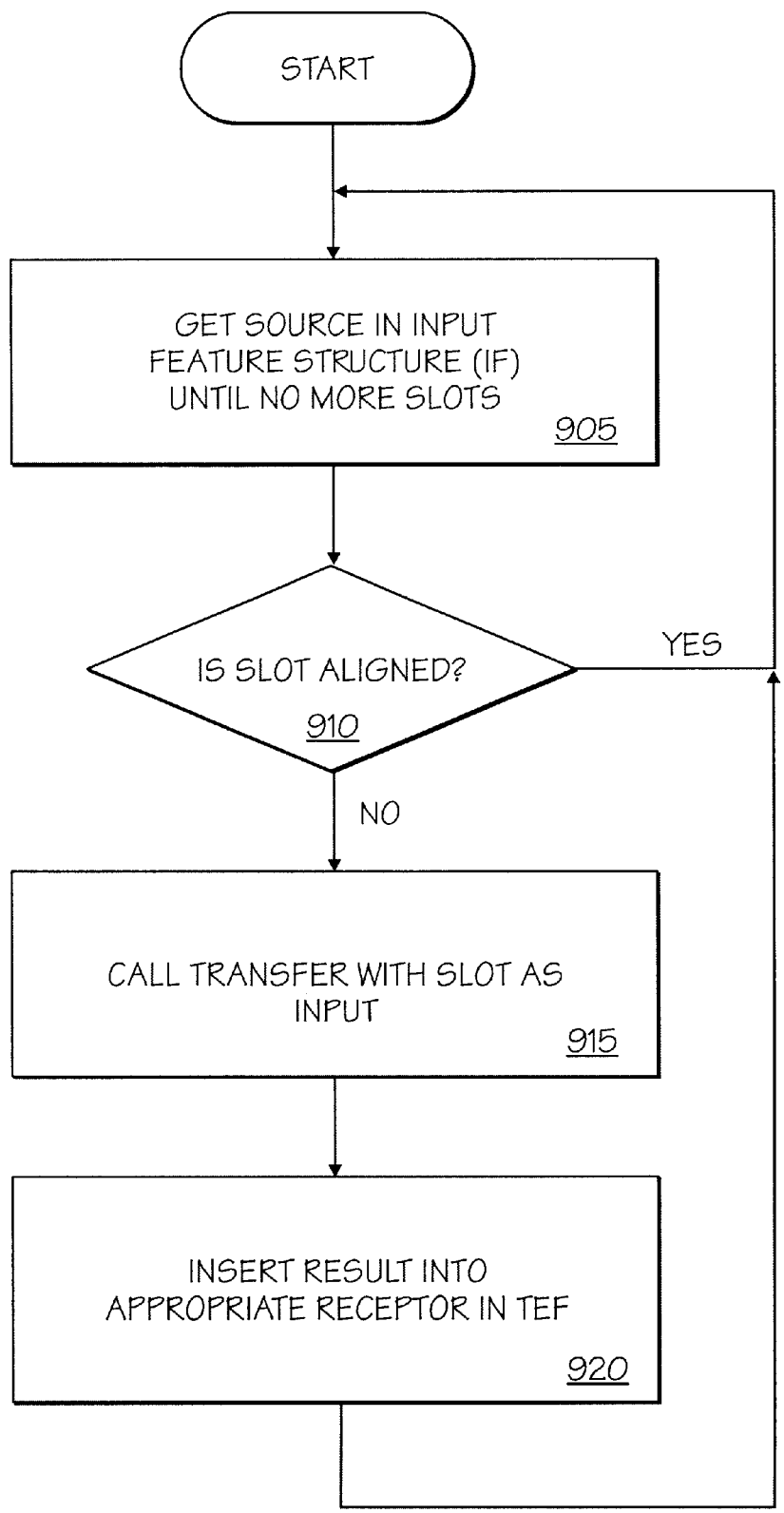
FIG. 9 is a flow diagram of one embodiment for aligning sub-structures.

FIG. 9 is a flow diagram of one embodiment for aligning slots between SLS 302 and SEF 410. Initially at processing block 905, each input slot 504 in SLS 302 is processed until no more slots 504 are available. Next at processing block 910, if input slot 504 is aligned, processing returns to processing block 905. However, if input slot 504 is not aligned, processing continues at processing block 915.

If slot 504 is not aligned, at processing block 915, the unaligned slot 504 is used as input to transfer module 222. Within processing block 915, steps 805 through 815 of FIG. 8 are performed with the unaligned slot 504 as input. Thus, slot 504 is received, and a transfer generation tree is created. A returned sub-slot is matched against the example database 220 and aligned with SEF 520.

Referring to FIG. 9, at processing block 920, the result of processing block 915 is inserted into the corresponding slot in TEF 420. Processing then returns to processing block 905 until all slots are processed.

Referring to FIG. 7a, the processing of FIG. 9 may be applied to the word (or slot) "tomorrow" 718. Word (or slot) 718 is not aligned with any word (or slot) within source example 704; therefore, the word or slot 718 would be used as input to transfer module 222 as represented by steps 805 through 815 of FIG. 8. The process blocks of FIG. 8 and FIG. 9 would be applied to word or slot 718 until a good match is found. Thus, the processing steps of FIGS. 8 and 9 would be recursively executed until a match of the entire SLS 302 is processed.

Figure 10:
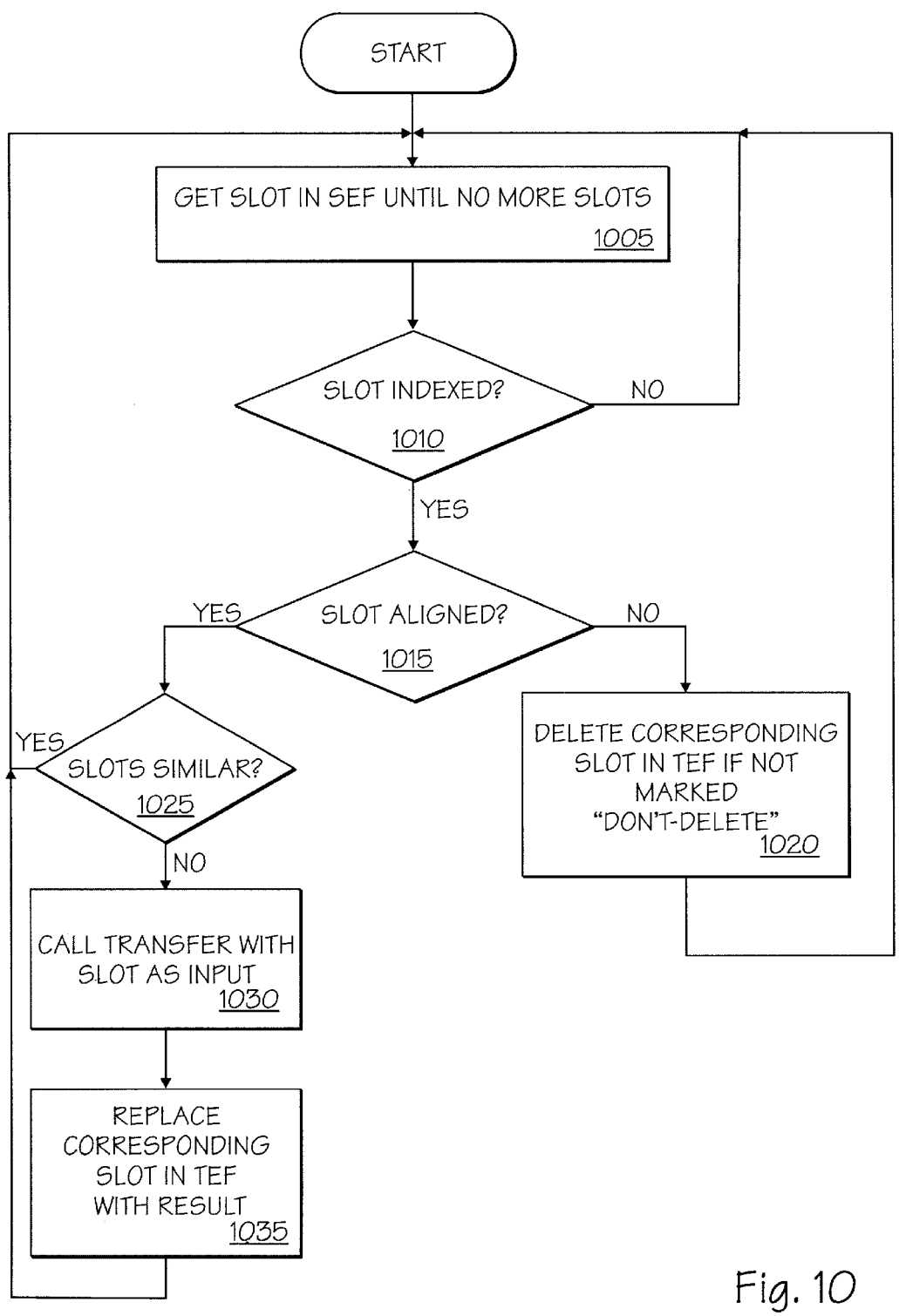
FIG. 10 is a flow diagram of one embodiment for transferring indexed sub-structures.

FIG. 10 is a flow diagram of one embodiment for transferring indexed slots. Initially at processing block 1005, all slots within SEF 410 are processed until no slots remain to be processed. Next at processing block 1010, it is determined whether the slot is indexed. If the slot is not indexed, processing returns to processing block 1005 until all slots are processed. However, if a slot is indexed, processing continues at processing block 1015.

At processing block 1015, it is determined whether the indexed slot is aligned. If the indexed slot is not aligned, processing continues at processing block 1020. If the indexed slot is aligned, processing continues at processing block 1025.

If the indexed slot is not aligned, at processing block 1020, the corresponding individual TEF 420 slot is checked to determine whether the slot may be deleted. If the slot is marked "DON'T-DELETE", the slot from TEF 420 is used. If the TEF 420 slot is not marked "DON'T-DELETE", the slot in TEF 420 is dropped and deleted from the structure. Processing then continues at processing block 1005.

If at processing block 1015, the indexed slot is found to be aligned, at processing block 1025, it is determined whether the slots are similar. A call is made to transfer grammar 218 and the matching rules (as described above) are applied to determine whether the slots are similar. Transfer module 222 matches SLS 302 to SEF 410 slots in example database 220. Transfer module 222 executes thesaurus matching system 350 to determine corresponding thesaurus 214 codes for both slots. These codes serve as input to a matching module within thesaurus matching system 350. Matching module searches thesaurus 214 to find the most specific thesaurus 214 entry that dominates a thesaurus code from each representation. Matching module retrieves previously calculated relative entropy values from thesaurus 214 and calculates an overall match cost for the slots. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2c is used to break the sub-structure into multiple sub-structures. The new input may be a part of the original, source feature structure or a new feature sub-structure that is constructed from sections of certain slots. If the slots are similar, the slot in TEF 420 is used. However, if the slots are not similar, the processing continues at processing block 1030.

If the indexed aligned slot from SEF 510 is not of similar nature to the indexed aligned slot of TEF 420, the transfer module 222 is called with the indexed slot from SLS 302 as input. The processing blocks of FIGS. 8 and 9 are executed to find a similar slot within bilingual example database 220.

The result of the processing of FIGS. 8 and 9 with the indexed aligned slot from processing block 1030 is placed into the corresponding slot of TEF 420 at processing block 1035. Processing then continues at processing block 1005.

Figure 11:
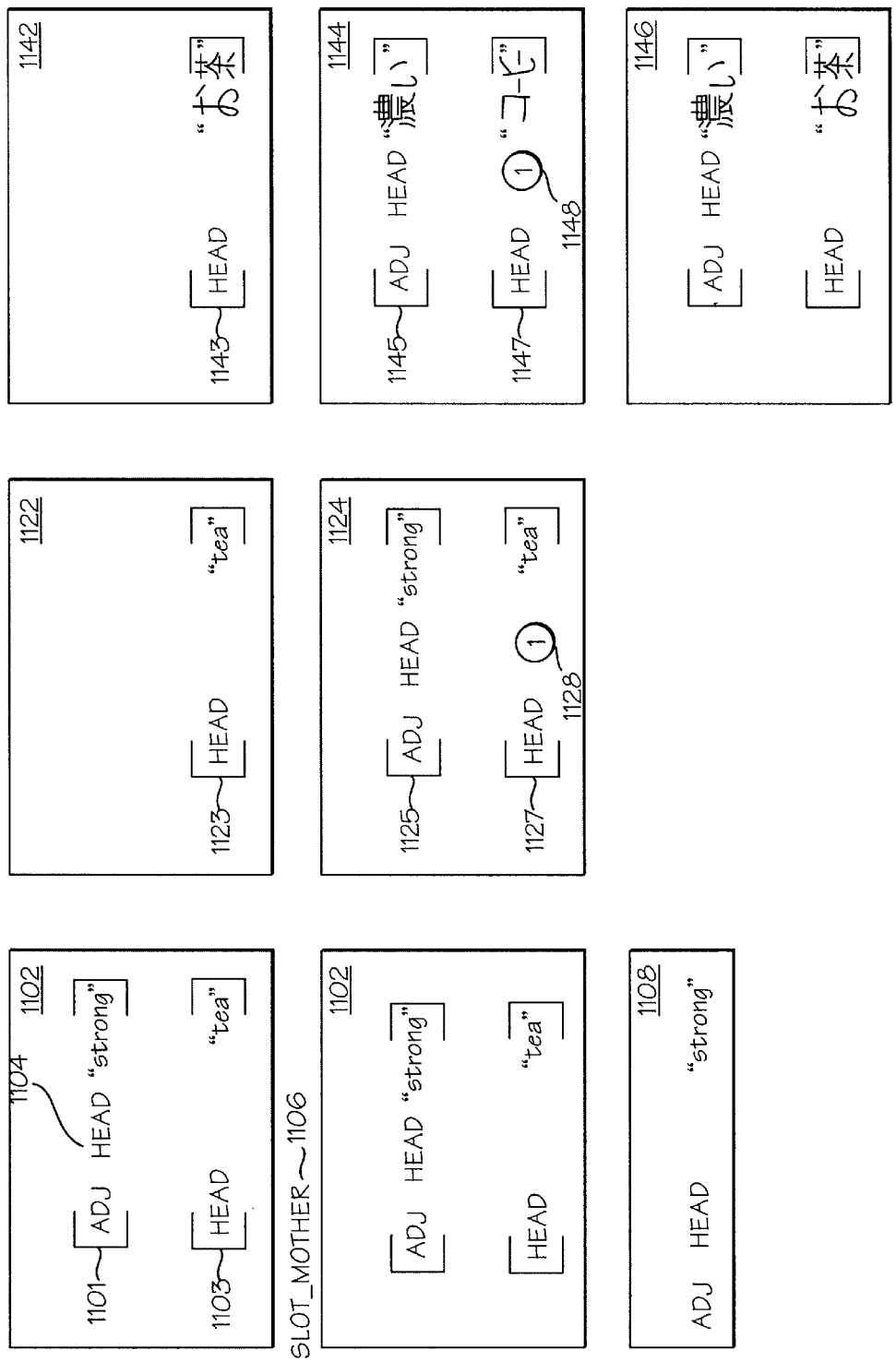
FIG. 11 is one embodiment of a non-head transfer.

FIG. 11 is one embodiment of a non-head transfer. Referring to FIG. 11, SLS 1102 contains an adjective slot 1101 containing a "HEAD" linguistic symbol 1104. In the FIG. 11 example, the adjective slot 1101 contains the adjective "strong". In addition, SLS 1102 contains the slot 1103 with a "HEAD" linguistic symbol representing the noun "tea". The best match found for SLS 1102 is the database pair 400 containing SEF 1122 and TEF 1142. SEF 1122 contains the slot 1123 with the linguistic symbol of "HEAD" for the noun "tea". FIG. 11 also shows TEF 1142 with a corresponding slot 1143 for slot 1123.

Because the context of an adjective noun pair within a sentence may change the meaning of words, special processing is required to replace an adjective, such as "strong", in performing transfer. Referring to FIG. 11, SLS 1102 is indexed by a "SLOT_MOTHER" 1106. In addition, a new slot 1108 containing the original adjective slot 1101 is created. The new slot 1108 is used as input to database 220 which results in matching "SLOT_MOTHER" 1106 to SEF 1124. In the example of FIG. 11, the match against database 220 results in an adjective slot 1125 for the adjective "strong" and a noun slot 1127 for the noun "coffee". The slot 1127 is indexed at 1128. Thus, as described above, a new search is performed using slot 1127 as input to transfer module 222. The initial lookup of database 220 resulted in TEF 1144. TEF 1144 contains slot 1145 and 1147. Slot 1145 corresponds to slot 1125 and slot 1147 corresponds to slot 1127. Slot 1147 is indexed at 1148 and corresponds to the index at 1128. The results of the initial lookup as shown in SLS 1102, SEF 1122, and TEF 1142 is merged with the indexed replaced slot 1124 and 1144. The result is shown at 1146.

Thus, the initial lookup returned for the input "strong tea" returned "tea". The secondary lookup for "strong" found "strong coffee" within database 220. "Coffee" was then used as input for the indexing feature, as described in reference to FIG. 10, to replace "coffee" with the original input "tea".

The specific arrangements and methods herein are merely illustrative of the principles of this invention. Numerous modifications in form and detail may be made by those skilled in the art without departing from the true spirit and scope of the invention.

What is claimed is:

1. A computerized method of transforming an input source language linguistic feature structure (SLS) representing an expression in the source language to a target language linguistic feature structure (TLS) representing the expression in the target language, comprising:
   matching the SLS to at least one existing source language example linguistic feature structure (SEF);
   aligning the SLS with the at least one SEF; and
   generating the TLS using at least one target language example linguistic feature structure (TEF) corresponding to the at least one SEF.

2. The method of claim 1 wherein matching further comprises:
   applying transfer grammar rules to the SLS to create at least one SLS sub-structure.

3. The method of claim 2 wherein the transfer grammar rules are recursively applied to the SLS sub-structure from a top-most transfer rule until all SLS sub-structures within SLS are transferred to corresponding TEF sub-structures contained within the TEF.

4. The method of claim 2 further comprising:
   compiling the transfer grammar rules to generate a transfer grammar.

5. The method of claim 2 wherein matching further comprises:

applying compiled context-free grammar rules to the at least one SLS sub-structure.

6. The method of claim 5 wherein the context-free grammar rules are applied recursively from specific SLS sub-structures to more general SLS sub-structures contained within the SLS.

7. The method of claim 2 wherein generating the TLS is applied recursively from larger SLS sub-structures to smaller SLS sub-structures.

8. The method of claim 2 further comprising:

combining at least two SLS sub-structures to calculate a match cost with the SEF sub-structure.

9. The method of claim 2 wherein aligning further comprises:

if the at least one SLS sub-structure is not aligned,
performing said matching, aligning, and generating using the unaligned at least one SLS sub-structure as input until a matched, aligned sub-structure is found to produce at least one sub-TLS, and
inserting the at least one resulting sub-TLS into a corresponding TEF sub-structure.

10. The method of claim 2 further comprising:

if the at least one SEF sub-structure is indexed and if the at least one SEF sub-structure is not aligned,
deleting the corresponding at least one TEF sub-structure if the at least one TEF sub-structure is not marked "don't delete".

11. The method of claim 2 further comprising:

if the at least one SEF sub-structure is indexed and if the at least one SEF sub-structure is aligned,
if the at least one SEF sub-structure is not similar to the corresponding at least one SLS sub-structure,
performing said matching, aligning, and generating using the at least one SEF sub-structure, producing at least one resulting sub-TLS, and
replacing the corresponding at least one TEF sub-structure with the at least one resulting sub-TLS.

12. The method of claim 1 wherein the SEF and corresponding TEF are maintained in a bilingual example database.

13. The method of claim 1 wherein matching further comprises:

if an exact match is found, transferring the matching SEF to the corresponding TEF to produce the TLS.

14. The method of claim 1 wherein matching further comprises:

generating a match cost; and
accepting the matching SEF if the match cost is within pre-defined limits.

15. A system for transforming an input source language linguistic feature structure (SLS) representing an expression in the source language to a target language linguistic structure (TLS) representing the expression in the target language, comprising:

means for matching the SLS to at least one existing source language example linguistic feature structure (SEF);
means for aligning the SLS with the at least one SEF; and
means for generating the TLS using at least one target language example linguistic feature structure (TEF) corresponding to the at least one SEF.

16. A computer readable medium comprising instructions, which when executed on a processor, perform a method for transforming an input source language linguistic feature structure (SLS) representing an expression in the source language to a target language linguistic feature structure (TLS) representing the expression in the target language, comprising:

matching the SLS to at least one existing source language example linguistic feature structure (SEF);
aligning the SLS with the at least one SEF; and
generating the TLS using at least one target language example linguistic feature structure (TEF) corresponding to the at least one SEF.

17. The medium of claim 16 wherein matching further comprises: applying transfer grammar rules to the SLS to create at least one SLS sub-structure.

18. The medium of claim 17 wherein the transfer grammar rules are recursively applied to the SLS sub-structure from a top-most transfer rule until all SLS sub-structures within SLS are transferred to corresponding TEF sub-structures contained within the TEF.

19. The medium of claim 17 further comprising:

compiling the transfer grammar rules to generate a transfer grammar.

20. The medium of claim 17 wherein matching further comprises:

applying compiled context-free grammar rules to the at least one SLS sub-structure.

21. The medium of claim 20 wherein the context-free grammar rules are applied recursively from specific SLS sub-structures to more general SLS sub-structures contained within the SLS.

22. The medium of claim 17 wherein generating the TLS is applied recursively from larger SLS sub-structures to smaller SLS sub-structures.

23. The medium of claim 17 further comprising:

combining at least two SLS sub-structures to calculate a match cost with the SEF sub-structure.

24. The medium of claim 17 wherein aligning further comprises:

if the at least one SLS sub-structure is not aligned,
performing said matching, aligning, and generating using the unaligned at least one SLS sub-structure as input until a matched, aligned sub-structure is found to produce at least one sub-TLS, and
inserting the at least one resulting sub-TLS into a corresponding TEF sub-structure.

25. The medium of claim 17 further comprising:

if the at least one SEF sub-structure is indexed and if the at least one SEF sub-structure is not aligned,
deleting the corresponding at least one TEF sub-structure if the at least one TEF sub-structure is not marked "don't delete".

26. The medium of claim 17 further comprising:

if the at least one SEF sub-structure is indexed and if the at least one SEF sub-structure is aligned,
if the at least one SEF sub-structure is not similar to the corresponding at least one SLS sub-structure,
performing said matching, aligning, and generating using the at least one SEF sub-structure, to produce at least one resulting sub-TLS, and
replacing the corresponding at least one TEF sub-structure with the at least one resulting sub-TLS.

27. The medium of claim 16 wherein the SEF and corresponding TEF are maintained in a bilingual example database.

28. The medium of claim 16 wherein matching further comprises:

if an exact match is found, transferring the matching SEF to the corresponding TEF to produce the TLS.

29. The medium of claim 16 wherein matching further comprises:
   generating a match cost; and
   accepting the matched SEF if the match cost is within pre-defined limits.

30. An apparatus for transforming an input source language linguistic feature structure (SLS) representing an expression in the source language to a target language linguistic feature structure (TLS) representing the expression in the target language, comprising:
   a transfer module configured to match the SLS to at least one existing source language example linguistic feature structure (SEF), align the SLS with the at least one SEF, and generate the TLS using at least one target language example linguistic feature structure (TEF) corresponding to the at least one SEF.

31. The apparatus of claim 30 wherein the transfer module is further configured to:
   apply transfer grammar rules to the SLS to create at least one SLS sub-structure.

32. The apparatus of claim 31 wherein the transfer grammar rules are recursively applied to the SLS sub-structure from a top-most transfer rule until all SLS sub-structures within SLS are transferred to corresponding TEF sub-structures.

33. The apparatus of claim 31 further comprising:
   a compiler configured to compile the transfer grammar rules to generate a transfer grammar.

34. The apparatus of claim 31 wherein the transfer module is further configured to apply compiled context-free grammar rules to the at least one SLS sub-structure.

35. The apparatus of claim 34 wherein the context-free grammar rules are applied recursively from specific SLS sub-structures to more general SLS sub-structures contained within the SLS.

36. The apparatus of claim 31 wherein the generation of TLS is applied recursively from larger SLS sub-structures to smaller SLS sub-structures.

37. The apparatus of claim 31 wherein the transfer module is further configured to combine at least two SLS sub-structures to calculate a match cost with the SEF sub-structure.

38. The apparatus of claim 30 wherein the SEF and corresponding TEF are maintained in a bilingual example database.

39. The apparatus of claim 30 wherein the transfer module is further configured to:
   transfer the matching SEF to the corresponding TEF to produce the TLS if an exact match is found.

40. The apparatus of claim 30 further comprising:
   a thesaurus matching system configured to generate a match cost.

41. The apparatus of claim 40 wherein transfer module is further configured to accept the matching SEF if the match cost is within pre-defined limits.

42. A memory for storing data for access by an application program being executed on a data processing system, comprising:
   a data structure stored in said memory, said data structure including information resident in a database used by said application program and including:
      a plurality of bilingual example pairs used for the matching of data, wherein each bilingual example pair includes
         a source language example linguistic feature structure representing an expression in the source language, and
         a target language example linguistic feature structure corresponding to the source language example linguistic feature structure.

* * * * *